United States Patent [19]

Ise

[11] Patent Number: 4,795,236
[45] Date of Patent: Jan. 3, 1989

[54] OPTICAL LOW PASS FILTER UTILIZING A PHASE GRATING

[75] Inventor: Kouichi Ise, Tokyo, Japan
[73] Assignee: Sony Corporation, Tokyo, Japan
[21] Appl. No.: 811,817
[22] Filed: Dec. 20, 1985

[30] Foreign Application Priority Data

Dec. 25, 1984 [JP] Japan ................................ 59-272018

[51] Int. Cl.$^4$ .......................... G02B 5/18; H04N 9/07
[52] U.S. Cl. ................................ 350/162.2; 358/331
[58] Field of Search ....................... 350/162.2, 162.17; 358/331

[56] References Cited

U.S. PATENT DOCUMENTS

| | | | |
|---|---|---|---|
| 3,821,795 | 6/1974 | Okano | 358/47 |
| 3,910,683 | 10/1975 | Nishino et al. | 350/162.2 |
| 4,009,939 | 3/1977 | Okano | 350/162.2 |
| 4,178,611 | 12/1979 | Okano | 350/162 SF |

OTHER PUBLICATIONS

Oldengarm, J., "Development of Rotating Diffraction Gratings and Their Use in Laser Anemometry", *Optics and Laser Technology*, vol. 9, No. 2, Apr. 1977, pp. 69–71.

Mino et al, "Optical Low-Pass Filter for a Single-Vidicon Color Television Camera", Journal of the SMPTE, Apr. 1972, vol. 81, pp. 282–285.

Townsend, "Spatial-Frequency Filter for a Kell-Type Color Camera", Nov. 1972 issue of Applied Physics, vol. 11, No. 11, pp. 2463–2471.

Oikawa et al, article "Distributed-index Planar Microlens", Mar. 15, 1982 issued of Applied Physics, vol. 21, No. 6, pp. 1052–1056.

*Primary Examiner*—Bruce Y. Arnold
*Attorney, Agent, or Firm*—Hill, Van Santen, Steadman & Simpson

[57] ABSTRACT

An optical low pass filter including a phase grating, wherein the grating is implanted inwardly from the surface of a substrate, the grating having a uniform repetitive period and having a refractive index different from that of the substrate.

7 Claims, 5 Drawing Sheets

OPTICAL LOW PASS FILTER UTILIZING A PHASE GRATING

BACKGROUND OF THE INVENTION

1. Field of the Invention

The present invention is in the field of low pass filters for single tube color television cameras, color television cameras using solid state imagers and the like.

2. Description of the Prior Art

A single tube color television camera using a stripe color filter or a solid state color television camera using a solid state imager of a discrete picture element structure is usually designed to obtain an image output corresponding to each of the picture elements of an optical image by an optical spatial sampling of the image.

In a color television camera adapted to perform optical spatial sampling for the optical image, the fineness of the picture pattern that can be processed is determined by the sampling frequency. If the optical image contains a higher frequency component than that of the defined spatial frequency, spurious noises are generated resulting in colors having no connection with the optical image in the reproduced image. In view of the foregoing, an optical low pass filter has been incorporated in the optical imaging system for restricting the higher spatial frequency components in the optical image to prevent the generation of spurious noises in the conventional color television camera described above.

There has been proposed an optical low pass filter which is adapted to maintain a contrast as high as possible for spatial frequencies lower than the cut-off spatial frequency, utilizing the double refraction of a quartz device. However, this type of optical low pass filter suffers from a high material cost because of the quartz present, and requires a plurality of pieces of quartz in a color television camera using a solid state imager so that it is not suitable for mass production because of various problems in its manufacture.

There has also been suggested an optical low pass filter utilizing a phase grating based on the fact that the autocorrelation function of the pupil function of an optical system provides a transfer function for that system (the absolute value of which is referred to as MTF) in which an aberration is positively provided to the pupil function so as to obtain a desired optical characteristic.

An optical low pass filter utilizing a phase grating consisting of a thin film of a periodically repetitive stripe-like structure formed on the surface of a transparent substrate such as glass which is inserted into an optical system to provide a difference in optical distance between the transmission lights, that is, a phase difference due to the thin film of the stripe-like repetitive structure to thereby change the phase relationship of the pupil function and attain the characteristic of an optical low pass filter is shown, for example, in U.S. Pat. No. 3,821,795. In the conventional optical low pass filter utilizing a phase grating, a stripe-like thin film is deposited on the surface of a substrate in which the thin film has a repetitive structure of a rectangular or similar shape.

Reference is also invited to the article entitled "Optical Low-Pass Filter for a Single-Vidicon Color Television Camera" by Mino et al appearing in the April, 1972 issue of the Journal of the SMPTE, page 282. This article describes a rectangular wave phase grating prepared by means of vacuum evaporation of magnesium fluoride on a plane-parallel glass plate.

An article by Townsend appearing in the November 1972 issue of "Applied Optics", page 2463, describes a low pass filter of the rectangular wave phase grating type in which the grating is composed of dichromated gelatin.

In structures of the type described, the MTF value of the optical image in the lower spatial frequency region which is particularly important among the image constituent elements is low to reduce the contrast. Furthermore, the pattern of the repetitive structure may appear on the screen if the aperture spot of the imaging system is restricted. Since the difference of refractive index between the vapor-deposited substance forming the thin film of rectangular cross-section and air is large, the error caused by the thickness of the vapor-deposited substance has to be kept within several hundred Angstroms upon production, which provides a substantial difficulty in manufacturing.

SUMMARY OF THE INVENTION

The present invention provides an optical low pass filter utilizing a phase grating of a novel structure which is capable of overcoming the problems existing in the aforementioned prior art.

In keeping with the present invention, we provide an optical low pass filter utilizing a phase grating in which a region having a refractive index N is implanted within the substrate in a repetitive pattern, the substrate having a refractive index $N_o$ which is different from the refractive index N.

In the optical low pass filter of the phase grating type in accordance with this invention, the difference in optical distance, that is, the characteristic of the optical low pass filter can be adjusted as desired by either varying the shape of the region having the refractive index N formed within the substrate or by varying the refractive index of the implanted region itself within the implanted region. It is possible by prearranging the shape of the region with the refractive index N or the distribution of the refractive index therein so as to obtain a smoothly rising characteristic of difference of optical distance, the MTF value in the lower spatial frequency region of the optical low pass filter using such a phase grating can be improved and the undesired phenomenon wherein the pattern of the periodically repeating structure appears on the screen upon restricting the aperture spot of the optical system can also be overcome. By providing the region having the refractive index N formed in the substrate with a small difference relative to the refractive index $N_o$ of the substrate, the depth of the region along one axis can be increased to facilitate the production of the filter. Specifically, it has been found desirable to maintain a relationship between N and $N_o$, as previously defined, as follows:

$$0 < N(x, y, z) - N_o \leq 0.2$$

BRIEF DESCRIPTION OF THE DRAWINGS

Other objects and features of the present invention will be made apparent by the following explanation of preferred embodiments thereof, referring to the accompanying drawings in which.

DESCRIPTION OF THE PREFERRED EMBODIMENTS

Figure 1:
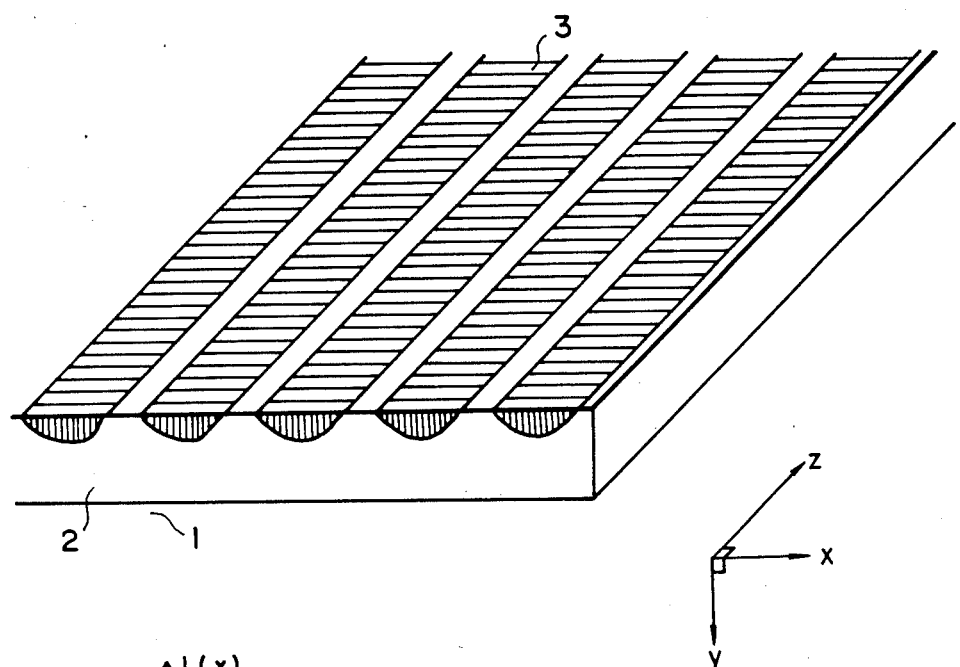
FIG. 1 is a schematic perspective view of the appearance of a first embodiment of an optical low pass filter utilizing a phase grating according to this invention.

The invention will be described in more detail by way of preferred embodiments of the optical low pass filter utilizing a phase grating according to the present invention, with reference to the drawings.

There is illustrated an optical low pass filter utilizing a phase grating 1 functioning as an optical low pass filter to an optical image having a high spatial frequency component in one direction. The filter comprises a substrate 2 with a refractive index $N_o$. Implanted in the substrate 2 is a grating 3 of a refractive index N (x, y) different from the refractive index $N_o$ and formed as a stripe-like pattern having a repetition period with a width a and the period P in the direction x acting as an optical low pass filter.

In this embodiment, assuming the cross-sectional shape of the grating 3 on the plane x-y of the filter 1 as y=l(x), the difference ΔL(x) in the optical distance between the light ray A (FIG. 4) transmitting only through the substrate 2 with the refractive index $N_o$ and the light ray B transmitting through the coordinate x is represented by the equation:

$$\Delta L(x) = \int_0^{l(x)} N(x,y)dy - N_o l(x) \quad (1)$$

Figure 2:
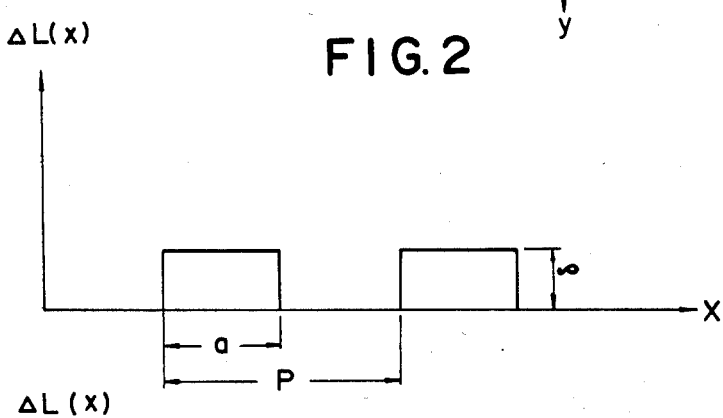
FIGS. 2 and 3 are characteristic charts showing the relationship between the difference ΔL(x) for the optical distance in the first embodiment.
Figure 3:
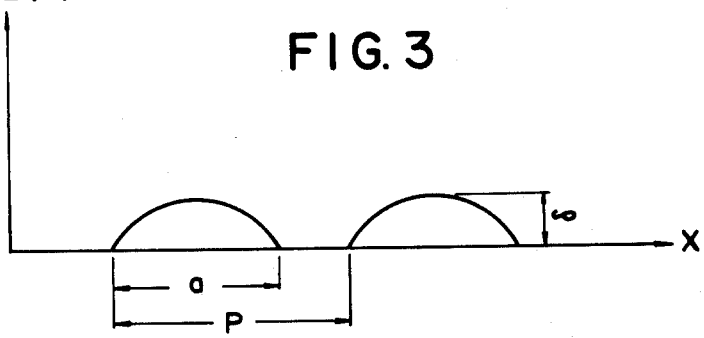
Figure 4:
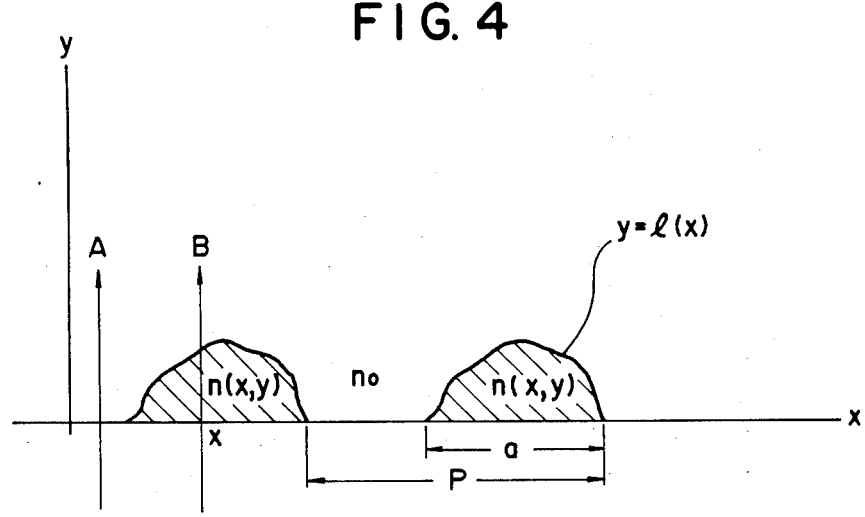
FIG. 4 is a schematic cross-sectional view illustrating the relationship between the characteristic of difference for the optical difference and the shape and the refractive index of the implanted region in the first embodiment.

The characteristic of the difference ΔL(x) for the optical distance can be determined by a rectangular or arcuate shape as, for example, shown in FIGS. 2 or 3 by varying the shape of the implanted region if the refractive index N is constant, or by providing the implanted region with a variation in refractive index if the shape is held constant. Accordingly, in the case of obtaining a characteristic of the difference ΔL(x) for the arcuate optical distance shown in FIG. 3, the implanted region can be formed into a cross section as shown in FIG. 4, depending on the refractive index distribution. A region with optional refractive index N can be formed in various shapes within the substrate having a uniform refractive index $N_o$ by utilizing techniques employed for the production of a micro lens array such as the ion exchange method or the like disclosed, for example, in Applied Optics/Vol. 21, No. 6, Mar. 15, 1982.

In the ion exchange method, a glass plate formed with a stripe-shaped pattern of a metal layer on the surface thereof is immersed into a molten salt bath containing positive ions to be substituted for the positive ions in the glass. Thus, positive ions such as $K^+$, $Na^+$ contained in the glass are substituted with a positive ion such as $Tl^+$ in the molten salt bath through the exposed surface of the glass. The regions thus ion exchanged have different refractive indices as compared with the original glass. The ion exchange can be further accelerated by application of an electric field.

In the optical low pass filter, the value ΔL(x) is adjusted such that the MTF value is less than 0.3 at a cut-off spatial frequency determined by the sampling theory of the pick-up optical system. If MTF≦0.3, spurious noises can be kept within a visually allowable range. A suitable ΔL(x) can be obtained by selecting the proper values for the period P, the width a, the shape, and the depth represented by the difference between the optical paths given by the maximum value of the equation (1).

Figure 5:
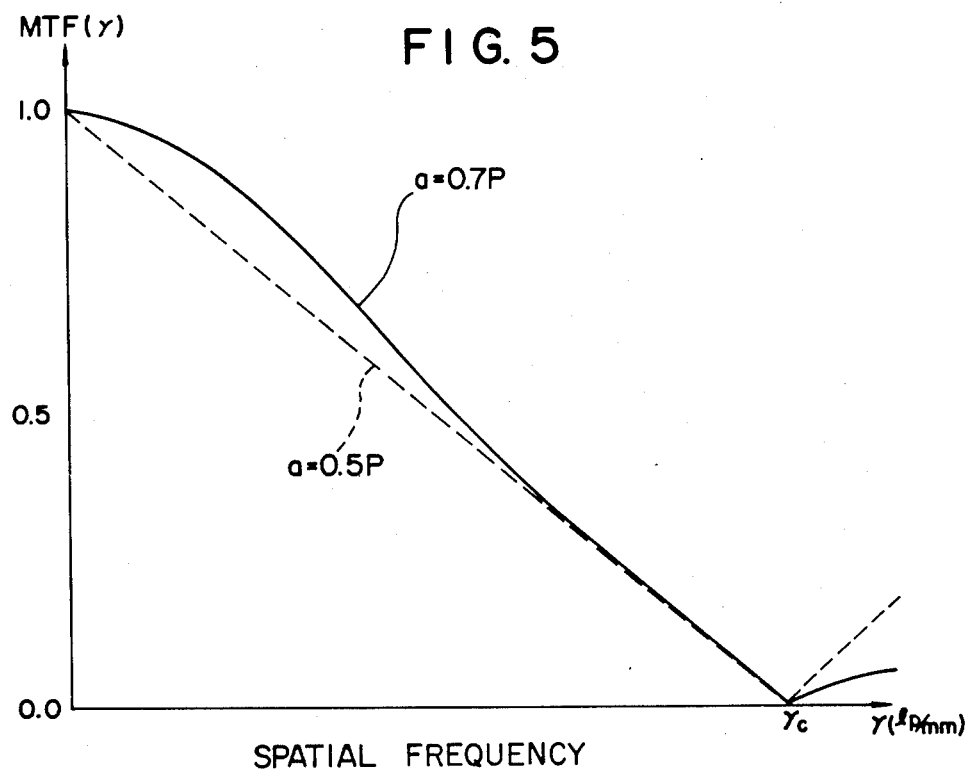
FIG. 5 is a graph plotting the MFT value against spatial frequency for the optical low pass filter and the characteristics of the difference for the respective optical differences shown in FIGS. 2 and 3 are used in the first embodiment.

In the above embodiment, an MTF characteristic as shown by the dotted line in FIG. 5 is obtained by providing the difference ΔL(x) for the rectangular optical difference as shown in FIG. 2, and setting the width a of the region 3 for a period length P of a=0.5P.

An MTF characteristic as shown by the solid line in FIG. 5 is obtained using the difference ΔL(x) for an arcuate optical difference as shown in FIG. 3, and setting the width a of the region with relation to the length of the period as a=0.7P. Thus, the arcuate optical difference provides an increased MTF value in the lower spatial frequency range as compared with a rectangular difference in the optical distance.

Furthermore, in the case of the rectangular difference, a pattern of the periodically repeating structure showing a rectangular ΔL(x) for the optical distance appears on the screen if it is applied to the color television camera and the image pick-up system is restricted in the same manner as the conventional optical low pass filter utilizing a phase grating. On the other hand, if the characteristic of the ΔL(x) for the optical distance is made arcuate so as to provide a smooth rising characteristic as described above, the pattern of the periodical structure appearing on the screen can be prevented.

Figure 6:
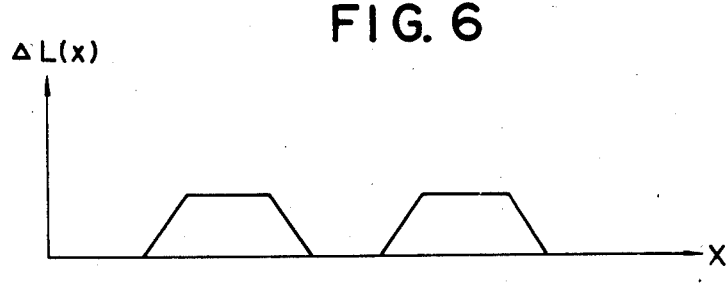
FIGS. 6 to 9 are graphs showing other examples of the characteristics of the difference ΔL(x) for the optical distances applied to the first embodiment.
Figure 7:
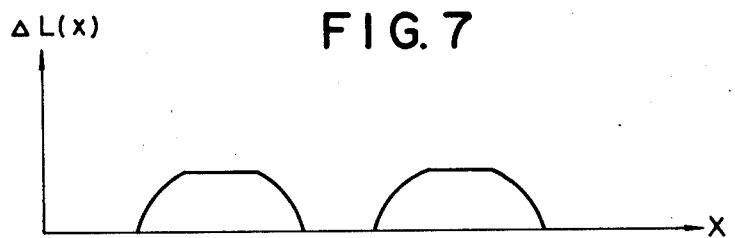
Figure 8:
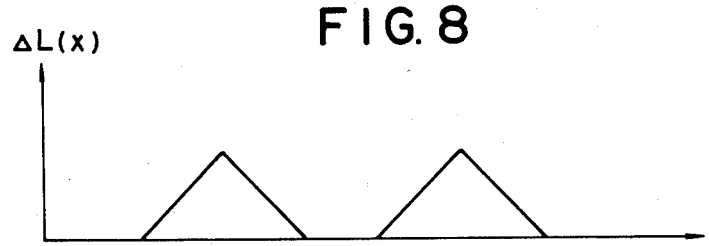
Figure 9:
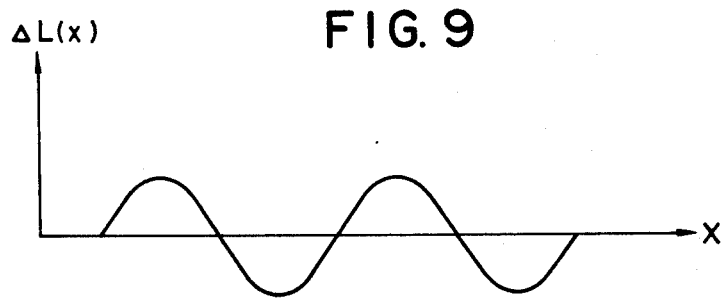

It is also possible to maintain the same performance as in the optical low pass filter utilizing an arcuate periodical shape by forming the difference ΔL(x) for the optical distance as a trapezoidal shape as shown in FIG. 6. The orthogonal sides of the trapezoid can be modified to embody a portion of an arc as shown in FIG. 7. The shape can also be triangular as shown in FIG. 8 or the periodically varying sinusoidal shape as shown in FIG. 9. In order to obtain an optical low pass filter utilizing a phase grating in which the shape of the difference ΔL(x) is one of those shown in the drawings, the refractive index N (x, y) and the shape l(x) in the first equation may be selected so as to obtain a desired difference ΔL(x) for the optical distance.

Figure 11:
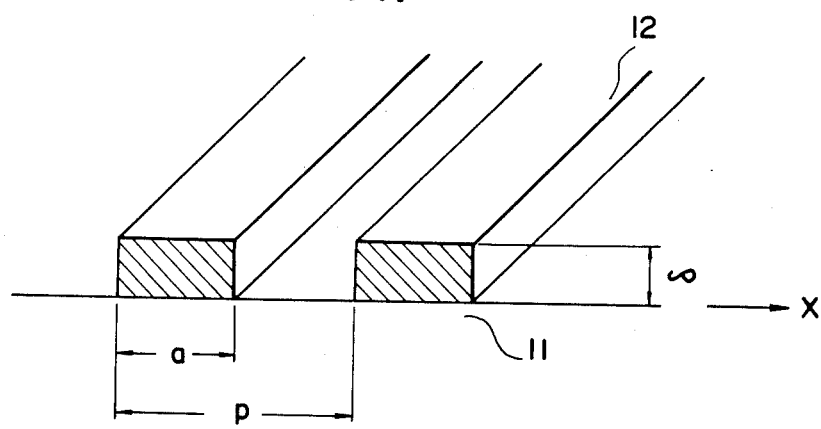
FIG. 11 is a schematic perspective view of a conventional optical low pass filter utilizing a phase grating.

In the conventional optical low pass filter utilizing a phase grating as described above and shown in FIG. 11 in which a thin film 12 of a stripe-like periodically repeating structure is formed on the surface of the substrate 11 through vapor deposition, the difference $\Delta L_o(x)$ for the optical distance between the light A transmitting only through the substrate 11 and the light B transmitting at the position of the coordinate x is represented by the equation:

$$\Delta L_o(x) = (N1 - N_{air})l_o(x) \quad \ldots \quad (2)$$

where
N1 is the refractive index of the vapor deposited substance forming the thin film 12 and
$l_o(x)$ is the cross-sectional shape of the thin film 12 and
$N_{air}$ is the refractive index of air.

In order to obtain an arcuate characteristic for the value $\Delta L(x)$ for the optical distance shown in FIG. 3, a substance with a refractive index N1 has to be vapor deposited so as to provide an arcuate cross-sectional shape for the thin film 12. If magnesium fluoride having an index of refraction of 1.38 is used as the vapor deposited substance, the vapor deposition has to be carried out in the shape $l_o(x)$ shown by the following equation:

$$\begin{aligned} l_o(x) &= \Delta L_o(x)/(N1 - N_{air}) \\ &= \Delta L_o(x)/0.38 \\ &= 2.6 \Delta L_o(x) \end{aligned} \quad (3)$$

in view of equation 2. However, it is difficult to perform such vapor deposition in view of the accuracy required.

Since a desired difference $\Delta L(x)$ for the optical difference can be obtained in the optical low pass filter utilizing the phase grating according to this invention by selecting the refractive index N (x, y) and the shape l(x) in the first equation as described above, an optical low pass filter utilizing a phase grating of an identical characteristic can be obtained even if the values l(x) and $l_o(x)$ are different from each other. This can be done by selecting the N (x, y) and the l(x) so that the $\Delta L(x)$ in the first equation and the $\Delta L_o(x)$ in the second equation satisfy the following equation:

$$\Delta L(x) = \Delta L_o(x) \quad \ldots \quad (4)$$

For example, in order to obtain the same difference $\Delta L(x)$ for the optical distance with the shape $l_o(x)$ shown by the third equation, the region 3 may be formed to a shape l(x) represented by the following equation:

$$l(x) = \Delta L_o(x)/(N_c - N_o) \quad \ldots \quad (5)$$

In view of the first equation and fourth equation, assuming the refractive index N (x, y) of the region 3 is constant ($N_c$). If $N_c - N_o$ is adjusted to about 0.01, x is about 40 times as large as $l_o(x)$ for obtaining the identical difference for the optical difference and accordingly, the region 3 is about twice as large as the conventional case of utilizing vapor deposition by setting the refractive index N (x, y) such that N (x, y) − $N_o$ is greater than zero but less than or equal to 0.2. Production is thus facilitated.

The present invention is not restricted to the situation where the refractive index of the striped region differs from that of the substrate and is formed in a stripe-like pattern of periodic repetition. Alternatively, an optical low pass filter may be provided by combining two optical low pass filters utilizing the phase grating of the first embodiment or by forming the regions with a refractive index N in a stripe-like pattern having a periodic recurrence in directions different from both sides of the substrate having a refractive index $N_o$. Furthermore, an optical low pass filter having two or more directions can be shown with the type of structure illustrated in FIG. 10 wherein the refractive index N (x, y, z) or the shape l(x, z) is also changed in the z direction in FIG. 1 so that the region 6 with a refractive index N (x, y, z) is provided with a periodicity in a two-dimensional manner with a periodicity on the substrate 7 having a refractive index $N_o$.

In the optical low pass filter utilizing the phase grating 5 of the second embodiment, since the region 6 with a refractive index n (x, y, z) has a periodicity in the direction x and the direction z, it has a difference $\Delta L(x, y, z)$ for the optical distance represented by the following equation:

$$\Delta L(x,z) = \int_o^{l(x,z)} N(x,y,z)dy - N_o l(x,z) \quad (6)$$

Consequently, it can act as an optical low pass filter in two or more directions of the optical images.

By studying the shape of the region having the refractive index N or the distribution of the refractive index thereof so that the characteristic of the difference for the optical distance may rise smoothly, the value for MTF in the lower spatial frequency of the optical low pass filter can be improved and, further, the undesired pattern of the periodical structure appearing on the screen can be avoided. By providing a region having a refractive index N formed within the substrate having a refractive index $N_o$ with a refractive index of a smaller difference relative to the refractive index $N_o$ of the substrate, that is, with a difference greater than zero but less than or equal to 0.20, the depth of the region with the refractive index N(x, y, z) in the direction y is increased to facilitate the production of the optical low pass filter according to this invention.

Figure 12:
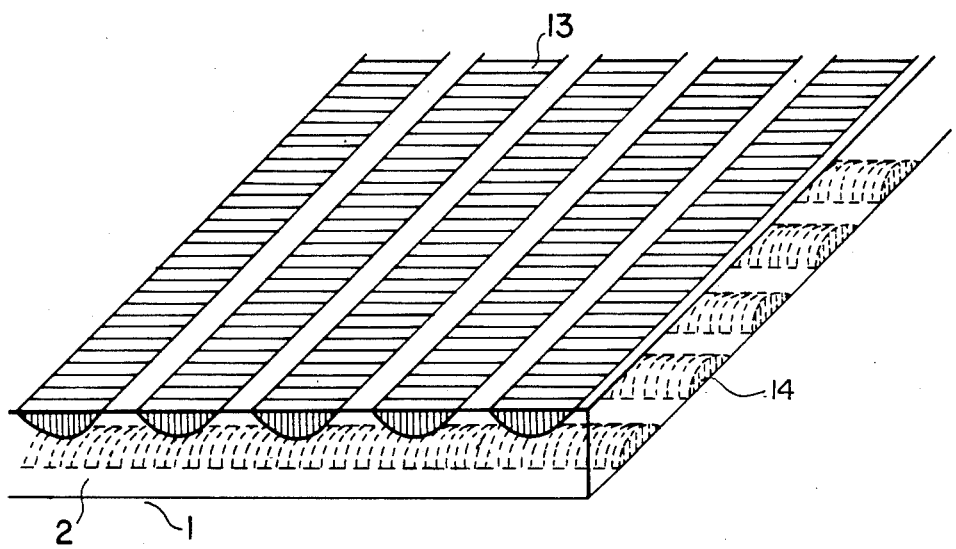
FIG. 12 is a schematic perspective view of still another form of the present invention.

Another form of the invention is illustrated in FIG. 12. This form illustrates a substrate 2 having a stripe-like pattern 13 embedded in the substrate with a regular pattern and a second stripe-like pattern 14 embedded in a surface of the substrate perpendicular to the surface in which the pattern 13 is formed. The periods of the patterns 13 and 14 are different from each other.

Figure 10:
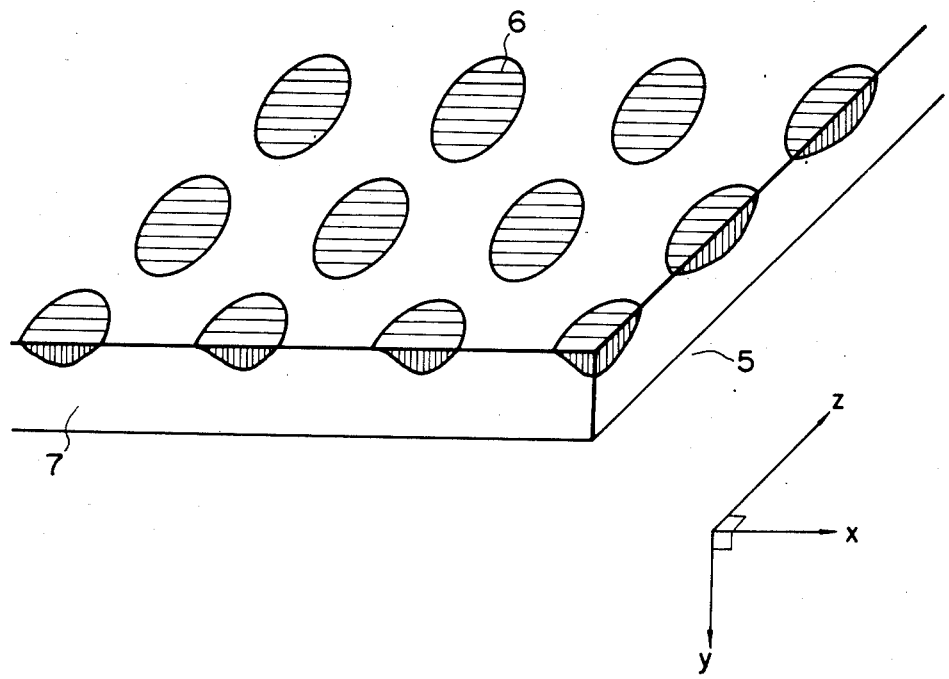
FIG. 10 is a schematic perspective view of a second embodiment of the present invention.

As seen in FIG. 10, the gratings may consist of discrete implants appearing in rows and columns on one surface which are perpendicular to each other.

It will be evident that various modifications can be made to the described embodiments without departing from the scope of the present invention.

I claim:

1. An optical low pass filter provided between an image source and an image pickup device including:
   a substrate having a pair of major surfaces,
   a grating implanted within said substrate and having a surface flush with one of said major surfaces, said grating having a uniform repetitive period and having a refractive index different from that of said substrate, one of said major surfaces receiving image light from said image source and said optical low pass filter deriving image light with a suppressed spatial frequency component higher than a predetermined spatial frequency to be supplied to said image pickup device.

2. An optical filter according to claim 1 wherein said grating consists of a stripe-like pattern.

3. An optical filter according to claim 1 which includes a pair of gratings formed in each of said major surfaces of said substrate, one of said gratings being oriented on one direction and the other grating being oriented in a direction perpendicular to said one direction, each of said pair of gratings having a period different from each other.

4. An optical filter according to claim 1 wherein the refractive index N of said grating and the refractive index $N_o$ of said substrate along the x, y and z axes have the following relationship:

$$0 < N(x, y, z) - N_o \leq 0.2$$

5. An optical filter according to claim 1 which includes gratings in one major surface extending in a plurality of rows and gratings in the other major surface extending in rows which are perpendicular to the rows of said one surface.

6. An optical low pass filter provided between an image source and an image pickup device comprising:
   a substrate composed of glass having a pair of major surfaces thereon,
   a phase grating formed within said substrate and having a surface flush with one of said major surfaces, said grating having a uniform repetitive period and formed of a glass having a refractive index different from that of said substrate,
   wherein one of said major surfaces receives image light from said image source and said optical low pass filter derives image light having a supressed spatial frequency component higher than a predetermined spatial frequency to be applied to said image pickup device.

7. An optical low pass filter according to claim 6, wherein said grating contains a different metal element from that of said substrate.

* * * * *